(12) United States Patent
An et al.

(10) Patent No.: US 11,841,706 B2
(45) Date of Patent: Dec. 12, 2023

(54) METHOD AND APPARATUS FOR AUTONOMOUS DRIVING OF MOBILE ROBOT IN ORCHARD ENVIRONMENT

(71) Applicant: Electronics and Telecommunications Research Institute, Daejeon (KR)

(72) Inventors: Su Yong An, Daegu (KR); Hea-Min Lee, Daegu (KR); Dongyeop Kang, Daegu (KR); Wookyong Kwon, Daegu (KR); Song Li, Daegu (KR); Ki Young Moon, Sejong-si (KR); Yun Su Chung, Daegu (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 176 days.

(21) Appl. No.: 17/188,688

(22) Filed: Mar. 1, 2021

(65) Prior Publication Data

US 2021/0278848 A1    Sep. 9, 2021

(30) Foreign Application Priority Data

Mar. 4, 2020 (KR) .......................... 10-2020-0027252

(51) Int. Cl.
  *G01S 17/89* (2020.01)
  *G05D 1/02* (2020.01)
  *G05D 1/00* (2006.01)

(52) U.S. Cl.
  CPC ............ *G05D 1/0212* (2013.01); *G01S 17/89* (2013.01); *G05D 1/0088* (2013.01); *G05D 1/0238* (2013.01); *G05D 2201/0201* (2013.01)

(58) Field of Classification Search
  CPC ....... G01C 21/38–3896; G05D 1/0088; G05D 1/0212; G05D 1/0238; G05D 1/024; G05D 1/0274; G05D 2201/0201
  See application file for complete search history.

(56) References Cited

U.S. PATENT DOCUMENTS

| | | | |
|---|---|---|---|
| 2005/0036689 A1* | 2/2005 | Mahdavieh | G01V 5/0008 382/199 |
| 2006/0133206 A1* | 6/2006 | Barnes | G01V 1/288 367/38 |
| 2013/0157600 A1* | 6/2013 | Kim | H04W 24/02 455/226.1 |
| 2017/0310569 A1 | 10/2017 | Clemm et al. | |
| 2019/0018427 A1 | 1/2019 | Jeon et al. | |
| 2019/0310653 A1 | 10/2019 | Lee et al. | |
| 2020/0029490 A1* | 1/2020 | Bertucci | G05D 1/0248 |
| 2020/0090339 A1* | 3/2020 | Doemling | G06V 10/764 |

* cited by examiner

*Primary Examiner* — Hunter B Lonsberry
*Assistant Examiner* — Matthew J. Reda
(74) *Attorney, Agent, or Firm* — William Park & Associates Ltd.

(57) ABSTRACT

A method and an apparatus for recognition a position and generating a path for autonomous driving of a mobile robot in an orchard environment are provided. The method converts three-dimensional (3D) point cloud data for the orchard environment into a 2D grid map, obtains a position of the mobile robot by performing local scan matching and global scan matching on the 2D grid map, and extracts a tree from the 2D grid map based on occupancy of each grid of the 2D grid map. Then, an effective line based on center points of extracted trees is obtained, a destination based on the obtained effective line is generated, and a driving path according to the generated destination and the position of the mobile robot is generated.

17 Claims, 17 Drawing Sheets

METHOD AND APPARATUS FOR AUTONOMOUS DRIVING OF MOBILE ROBOT IN ORCHARD ENVIRONMENT

CROSS-REFERENCE TO RELATED APPLICATION

This application claims priority to and the benefit of Korean Patent Application No. 10-2020-0027252 filed in the Korean Intellectual Property Office on Mar. 4, 2020, the entire contents of which are incorporated herein by reference.

BACKGROUND OF THE INVENTION

(a) Field of the Invention

The present disclosure relates to autonomous driving of a mobile robot. More particularly, the present disclosure relates to a method and an apparatus for autonomous driving of a mobile robot in an orchard environment.

(b) Description of the Related Art

In general, people or vehicles are mobilized when working in an orchard. As a large number of fruit trees are cultivated in the cultivation area of orchards, there are many difficulties in carrying out various agricultural tasks such as weeding and pest control work by workers during the cultivation process, or harvesting fruits from fruit trees. In recent years, in order to solve these difficulties, mobile robots that perform agricultural work on behalf of workers are emerging as a major issue.

These mobile robots can reduce worker labor consumption, improve convenience, and shorten working hours by performing various agricultural tasks on fruit trees while moving within the orchard.

Therefore, there is a need for a method capable of autonomously, accurately, and stably driving such mobile robots in an orchard environment.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present disclosure has been made in an effort to provide a method and an apparatus for recognizing a position and generating a path so that a mobile robot can drive autonomously.

According to an exemplary embodiment of the present disclosure, a method for recognizing a position and generating a path for autonomous driving of a mobile robot in an orchard environment is provided.

The method includes: converting three-dimensional (3D) point cloud data for the orchard environment into a two-dimensional (2D) grid map; obtaining a position of the mobile robot by performing local scan matching and global scan matching on the 2D grid map; extracting a tree from the 2D grid map based on occupancy of each grid of the 2D grid map; obtaining an effective line based on center points of extracted trees; and generating a destination based on the obtained effective line, and generating a driving path according to the generated destination and the position of the mobile robot.

In an implementation, the extracting of a tree may include: generating a tree candidate group based on a grid having a maximum occupancy for each local area of the 2D grid map; and extracting trees by removing outliers from the tree candidate group.

In an implementation, the smaller the distance between each point included in a grid and a predetermined plane, the more weight may be given to calculate the occupancy for each grid. Here, the extracting of trees by removing outliers may include: generating a two-dimensional (2D) covariance matrix projected on an (x-y) plane using a set number of points from among raw 3D point clouds around a center of a tree candidate included in the tree candidate group; calculating a ratio of eigenvalues in the generated 2D covariance matrix; and excluding a tree candidate from the tree candidate group when a ratio of the eigenvalues obtained for each tree candidate or a reciprocal of the ratio of the eigenvalues is greater than or equal to a predetermined value.

In an implementation, the obtaining of an effective line may include: extracting center points of the extracted trees in consideration of characteristics in which trees are arranged at a preset interval in a vertical axis and a horizontal axis in the orchard environment; and obtaining an effective line for path generation by using the center points of the extracted trees.

In an implementation, the obtaining of an effective line for path generation may include: performing clustering based on distances of the center points; extracting a local line around the mobile robot by performing line fitting in each cluster obtained according to the clustering; and obtaining an effective line by using the extracted local line.

In an implementation, the obtaining of an effective line by using the extracted local line may include merging the extracted local line with a pre-registered global line or registering the extracted local line as a new global line based on similarity between the pre-registered global line and the extracted local line to obtain a global line group and then obtain an effective line from the global line group.

In an implementation, the obtaining of an effective line by using the extracted local line may include obtaining a left line and a right line as an effective line among global lines included in the global line group, wherein the left line is a global line that is closest to the position of the mobile robot and that is located on a left side of the mobile robot, and the right line is a global line that is closest to the position of the mobile robot and that is located on a right side of the mobile robot.

In an implementation, the generating of a destination may include: when the effective line includes a left line located on the left side of the mobile robot and a right line located on the right side of the mobile robot, determining a center point between an end point of the left line and an end point of the right line as a destination of the mobile robot; and when the effective line includes only the left line or the right line, determining a point at a predetermined distance perpendicular to the included line in consideration of a rotation direction of the mobile robot as a destination of the mobile robot, wherein the predetermined distance may correspond to half of a horizontal axial spacing of trees arranged in the orchard environment.

In an implementation, the generating of a destination may include: generating a straight driving path of the mobile robot according to the destination; generating an obstacle avoidance path for avoiding an obstacle by additionally considering a position of the obstacle when the obstacle exists between the destination and the center of the mobile robot; and generating a rotation path in consideration of the rotation direction of the mobile robot when a distance between the end point of the effective line and the mobile robot is less than a minimum distance.

In an implementation, the obtaining a position of the mobile robot may include: performing local scan matching based on 3D point cloud data input at time t−1 and 3D point cloud data input at time t; performing global scan matching using the 3D point cloud data input at the point t and a global point cloud map; and obtaining the position of the mobile robot based on the local scan matching result and the global scan matching result.

In an implementation, the obtaining of the position of the mobile robot based on the local scan matching result and the global scan matching result may include correcting an estimated position of the mobile robot based on a position error according to the local scan matching result and a position error according to the global scan matching result to finally obtain the position of the mobile robot.

In an implementation; the converting of 3D point cloud data may include: extracting a plane to be projected for local 3D point data obtained from the 3D point cloud data; and projecting each 3D point of the local 3D point data onto the plane to obtain the 2D grid map, wherein the plane is the ground.

In an implementation, the method may further include, after the converting of 3D point cloud data, performing smoothing by using a value of a grid at a periphery of each grid of the 2D grid map, and the obtaining of a position of the mobile robot and the extracting of a tree are performed based on the smoothed 2D grid map.

According to another exemplary embodiment of the present disclosure, an apparatus for recognizing a position and generating a path for autonomous driving of a mobile robot in an orchard environment is provided.

The apparatus includes: an interface device configured to receive input of three-dimensional (3D) point cloud data for the orchard environment; and a processor configured to recognize a position of the mobile robot and generate a path based on the 3D point cloud data, wherein the processor is configured to perform the following operations: converting the 3D point cloud data for the orchard environment into a two-dimensional (2D) grid map; obtaining a position of the mobile robot by performing local scan matching and global scan matching on the 2D grid map; extracting a tree from the 2D grid map based on occupancy of each grid of the 2D grid map; obtaining an effective line based on center points of extracted trees; and generating a destination based on the obtained effective line, and generating a driving path according to the generated destination and the position of the mobile robot.

In an implementation, when performing the extracting of a tree, the processor may be configured to perform the following operations: generating a tree candidate group based on a grid having a maximum occupancy for each local area of the 2D grid map; generating a two-dimensional (2D) covariance matrix projected on an (x-y) plane using a set number of points from among raw 3D point clouds around a center of a tree candidate included in the tree candidate group; calculating a ratio of eigenvalues in the generated 2D covariance matrix; and excluding a tree candidate from the tree candidate group when the ratio of the eigenvalues obtained for each tree candidate or a reciprocal of the ratio of the eigenvalues is greater than or equal to a predetermined value; wherein the smaller the distance between each point included in a grid and a predetermined plane, the more weight is given to calculate the occupancy for each grid.

In an implementation, when performing the obtaining of an effective line; the processor may be configured to perform the following operations: extracting center points of the extracted trees in consideration of characteristics in which trees are arranged at a preset interval in a vertical axis and a horizontal axis in the orchard environment; performing clustering based on distances of the center points; extracting a local line around the mobile robot by performing line fitting in each cluster obtained according to the clustering; and obtaining an effective line by using the extracted local line.

In an implementation, the processor may be configured to merge the extracted local line with a pre-registered global line or register the extracted local line as a new global line based on similarity between the pre-registered global line and the extracted local line to obtain a global line group and then obtain an effective line from a global line group, and obtain a left line and a right line as an effective line among global lines included in the global line group, wherein the left line may be a global line that is closest to the position of the mobile robot and that is located on a left side of the mobile robot, and the right line may be a global line that is closest to the position of the mobile robot and that is located on a right side of the mobile robot.

In an implementation, when performing the generating of a destination, the processor may be configured to perform the following operations: when the effective line includes a left line located on the left side of the mobile robot and a right line located on the right side of the mobile robot, determining a center point between an end point of the left line and an end point of the right line as a destination of the mobile robot; and when the effective line includes only the left line or the right line, determining a point at a predetermined distance perpendicular to the included line in consideration of a rotation direction of the mobile robot as a destination of the mobile robot, wherein the predetermined distance corresponds to half of a horizontal axial spacing of trees arranged in the orchard environment.

In an implementation, when performing the generating of a destination, the processor may be configured to perform the following operations: generating a straight driving path of the mobile robot according to the destination; generating an obstacle avoidance path for avoiding an obstacle by additionally considering a position of the obstacle when the obstacle exists between the destination and the center of the mobile robot; and generating a rotation path in consideration of the rotation direction of the mobile robot when a distance between the end point of the effective line and the mobile robot is less than a minimum distance.

In an implementation, when performing the obtaining a position of the mobile robot, the processor may be configured to perform the following operations: performing local scan matching based on 3D point cloud data input at time t−1 and 3D point cloud data input at time t; performing global scan matching using the 3D point cloud data input at the point t and a global point cloud map; and correcting an estimated position of the mobile robot based on a position error according to the local scan matching result and a position error according to the global scan matching result to finally obtain the position of the mobile robot.

DETAILED DESCRIPTION OF THE EMBODIMENTS

Figure 1:
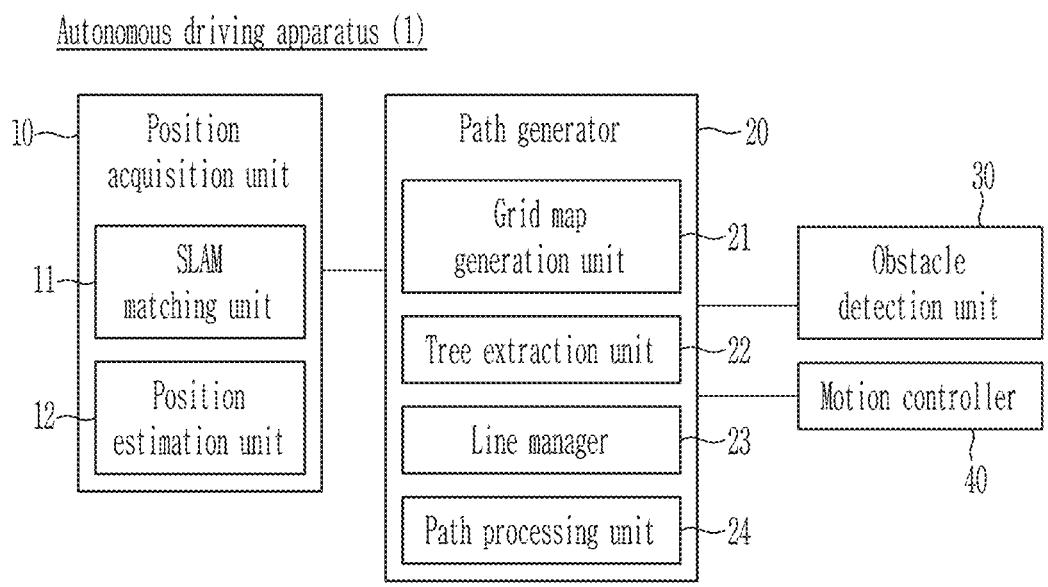
FIG. 1 shows a structure of an apparatus for autonomous driving of a mobile robot according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, in addition, unless explicitly described to the contrary, the word "comprise", and variations such as "comprises" or "comprising", will be understood to imply the inclusion of stated elements but not the exclusion of any other elements.

The expressions described in the singular may be interpreted as singular or plural unless an explicit expression such as "one", "single", and the like is used.

In addition, terms including ordinal numbers such as "first" and "second" used in embodiments of the present disclosure may be used to describe components, but the components should not be limited by the terms. The terms are only used to distinguish one component from another. For example, without departing from the scope of the present disclosure, a first component may be referred to as a second component, and similarly, the second component may be referred to as the first component.

Hereinafter, a method and an apparatus for autonomous driving of a mobile robot in an orchard environment according to an embodiment of the present disclosure will be described with reference to the drawings.

FIG. 1 shows a structure of an apparatus for autonomous driving of a mobile robot according to an exemplary embodiment of the present disclosure.

As shown in FIG. 1, an apparatus 1 for autonomous driving of a mobile robot according to an exemplary embodiment of the present disclosure (hereinafter, for ease of description, it will be referred to as an autonomous driving apparatus) includes a position acquisition unit 10, a path generator 20, an obstacle detection unit 30, and a motion controller 40.

The position acquisition unit 10 includes a SLAM (Simultaneous Localization and Mapping) matching unit 11 and a position estimation unit 12. The SLAM matching unit 11 compares sensing data (e.g., data from a LIDAR sensor) provided from a sensor unit (not shown) with a position on a map to obtain driving distance information, such as odometry information, of a mobile robot. The SLAM matching unit 11 may operate based on generalized iterative closest point (ICP) matching. In addition, the SLAM matching unit 11 creates a driving map of the mobile robot and recognizes its position based on the three-dimensional (3D) point cloud measured from the LIDAR sensor and the data (roll, pitch, yaw) from an IMU (Inertial Measurement Unit) sensor. The 3D point cloud data represents data that is provided from the 3D LIDAR and that consists of points obtained as a 3D image scan result by the LIDAR. This 3D point cloud data can be processed to generate local points for generating a driving path and sent to the path generator 20.

The position estimating unit 12 estimates the position and speed of the mobile robot. The position estimating unit 12 estimates the position (x, y, z) and speed (Vx, Vy, Vz) of the mobile robot based on an Extended Kalman Filter (EKF).

The path generator 20 is configured to generate a driving path of the mobile robot.

To this end, the path generator 20 includes a grid map generation unit 21, a tree extraction unit 22, a line manager 23, and a path processing unit 24.

The grid map generation unit 21 generates a two-dimensional (2D) grid map based on 3D point cloud data. The tree extraction unit 22 extracts a tree, that is, a tree from the generated 2D grid map. The line manager 23 performs clustering on the extracted trees using the center point of the tree, and extracts lines within the same cluster. Then, for the extracted line, life time management and line merging are performed. The path processing unit 24 generates a path based on the extracted line, and the generated path includes a straight forward path and a rotation path. This path processing unit 24 is also referred to as a path planner.

The obstacle detection unit 30 detects an obstacle on a path in which the mobile robot travels. For example, an obstacle can be detected using a collision sensor or an obstacle sensor.

The motion controller 40 controls the movement of the mobile robot based on the processing result of the position acquisition unit 10, the path generator 20, and the obstacle detection unit 30 so that the mobile robot drives autonomously. To this end, the motion controller 40 may generate control information for controlling motion for each type of mobile robot. For example, when a mobile robot is a differential wheel type of robot, control information of (v, w) is generated, where v represents a moving speed, and w represents a rotation speed. When a mobile robot is an Ackermann type of robot or a double Ackerman type of robot, control information of (v, δ) is generated, where δ represents a steering angle.

In the autonomous driving device 1 having such a structure, each component 10-40 can be independently executed, and each component 10-40 can transmit necessary data (messages).

Next, based on this autonomous driving device 1, a method for autonomous driving of a mobile robot will be described.

First, a method for creating a driving map for autonomous driving of a mobile robot and recognizing its position is described.

Figure 2:
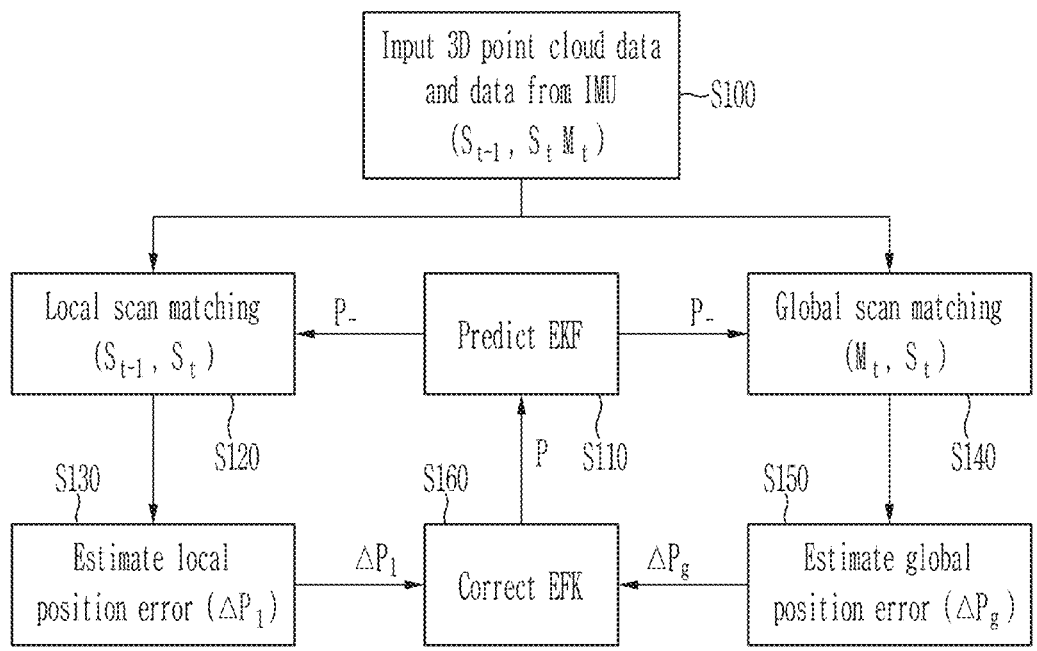
FIG. 2 is a flowchart of a method for creating a driving map and recognizing a position according to an exemplary embodiment of the present disclosure.

FIG. 2 is a flowchart of a method for creating a driving map and recognizing a position according to an exemplary embodiment of the present disclosure.

The position acquisition unit 10 of the autonomous driving device 1 receives 3D point cloud data provided from a sensor unit, for example, a Velodyne LIDAR sensor, and data from an IMU sensor, and creates a driving map, which is a 3D map, and simultaneously calculates the position of the mobile robot in real time based on the driving map.

For this, as shown in FIG. 2, the position acquisition unit 10 receives 3D point cloud data and data from an IMU sensor (S100). Here, $S_{t-1}$ represents 3D point cloud data at a time point t-1, $S_t$ represents 3D point cloud data at a time point t, and $M_t$ represents a global point cloud map.

The position at which the process of the position acquisition unit 10 starts is the initial position (x, y, z, roll, pitch, yaw). EKF-based prediction is performed based on the initial position (x, y, z) by the position estimating unit 12 to obtain a predicted position P_ (S110), and the SLAM matching unit 11 performs local scan matching based on the predicted position P_ and the 3D point cloud data input in real time (S120).

Figure 3:
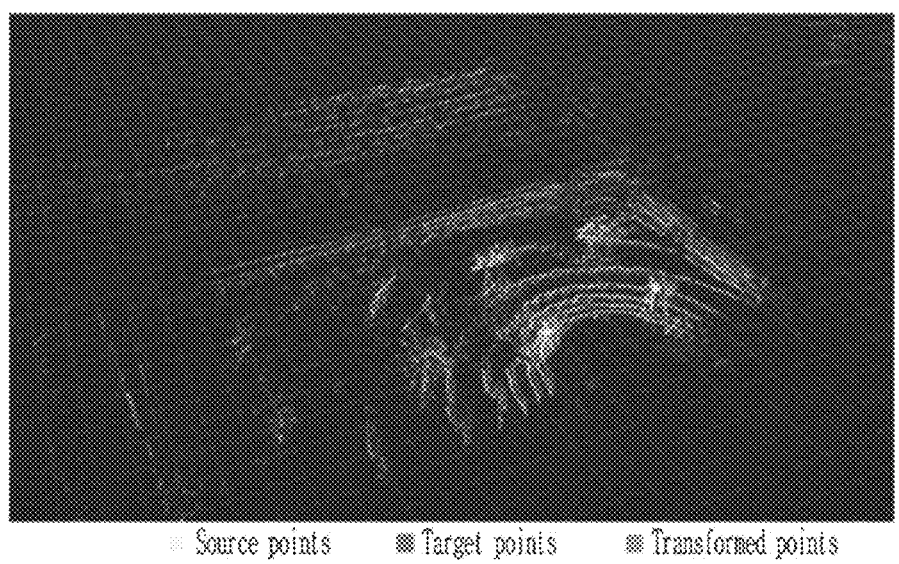
FIG. 3 is an exemplary diagram showing local scan matching according to an exemplary embodiment of the present disclosure.

FIG. 3 is an exemplary diagram showing local scan matching according to an exemplary embodiment of the present disclosure.

Odometry information is required for autonomous driving of the mobile robot. Since there is no odometry information provided by the mobile robot itself, the odometry information is generated through the local scan matching. For example, as shown in FIG. 3, Δp (pose) is extracted by matching the point cloud data $S_{t-1}$ obtained at time t1 and the point cloud data $S_t$ obtained at time t. If Δp is continuously accumulated, the position of the mobile robot can be estimated.

Then, the SLAM matching unit 11 obtains a local position error ($\Delta P_l$) based on the local scan matching result and the predicted position (S130).

In addition, the SLAM matching unit 11 performs global scan matching (S140).

Figure 4:
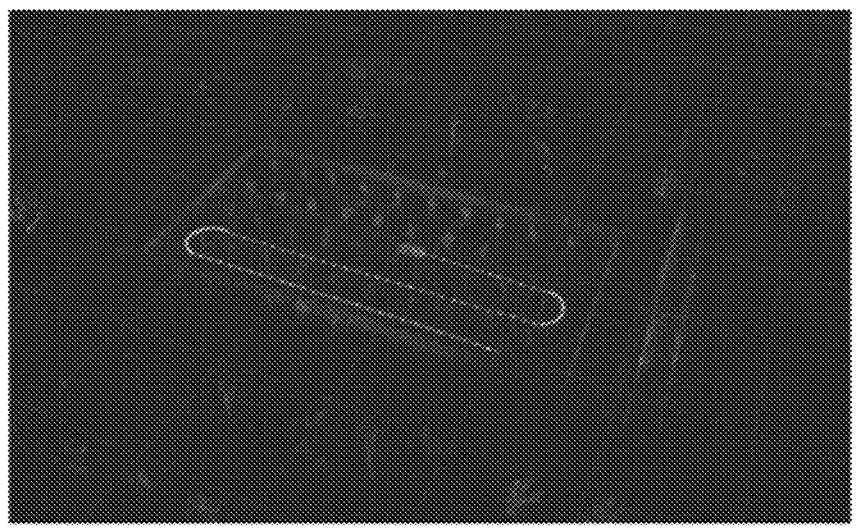
FIG. 4 is an exemplary diagram showing global scan matching according to an exemplary embodiment of the present disclosure.

FIG. 4 is an exemplary diagram showing global scan matching according to an exemplary embodiment of the present disclosure.

The position of the mobile robot can be estimated through local scan matching, but the position error increases as the driving continues. Therefore, the position of the mobile robot is corrected by performing periodic scan matching through global scan matching so that position errors are not accumulated. That is, by performing a matching scan using the current point cloud data $S_t$ and the global point cloud map $M_t$, the map as shown in FIG. 4 is created and the position is estimated.

Then, a global position error $\Delta P_g$ is obtained based on the global scan matching result and the predicted position P_ (S150).

Thereafter, the position estimation unit 12 corrects the estimated position based on the local position error $\Delta P_l$ and the global position error $\Delta P_g$ to obtain the current position P of the mobile robot (S160). Position data (x, y, z) according to the recognized current position (P) is obtained. In addition, when local matching is performed, the moving distance (Δx, Δy, Δz) during Δt can be known, so that the moving speed of the mobile robot can be predicted. Therefore, the moving speed ($V_x$, $V_y$, $V_z$) can be estimated based on the moving distance. The mobile robot's position and movement speed are continuously corrected using the EKF.

Through this process, it is possible to create a driving map and recognize its position for autonomous driving of a mobile robot.

Next, a method of generating a driving path for autonomous driving of a mobile robot will be described.

Figure 5A:
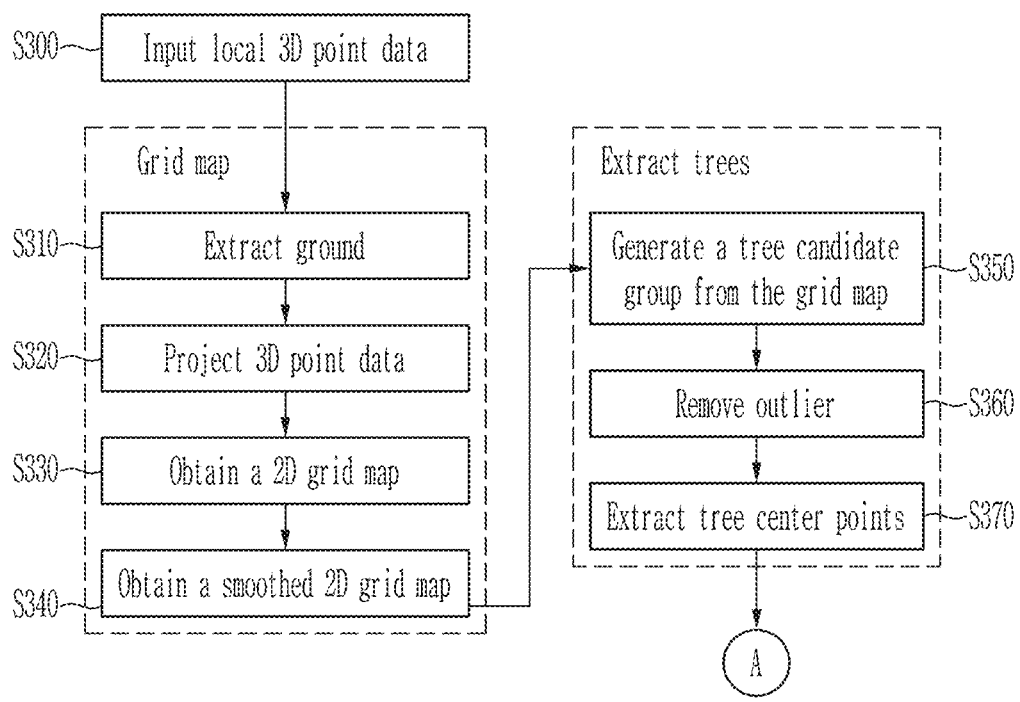
FIG. 5A and FIG. 5B are flowcharts of a method for generating a driving path according to an exemplary embodiment of the present disclosure.
Figure 5B:
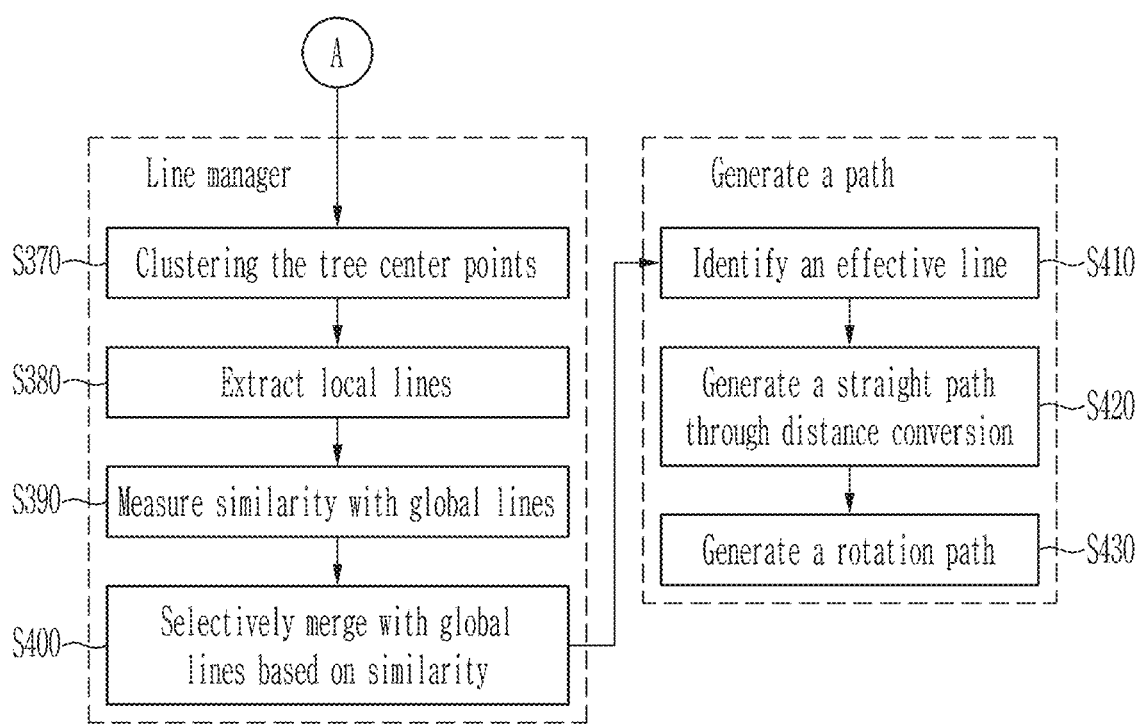

FIG. 5A and FIG. 5B are flowcharts of a method for generating a driving path according to an exemplary embodiment of the present disclosure.

Orchard trees are generally disposed at regular intervals along a vertical axis and a horizontal axis (e.g., 1.5 m~2 m intervals on the vertical axis, and 3 m~4 m intervals on the horizontal axis). In an exemplary embodiment of the present disclosure, the center point of each tree is extracted in order to generate a driving path in consideration of the characteristics of the orchard environment. In addition, it clusters using the distance between the center points of each extracted tree, extracts a local line within the same duster, and creates a straight path and a rotation path using the extracted line information.

The 3D point cloud data obtained from a Velodyne LIDAR sensor is processed by the position acquisition unit 10 to obtain local 3D point data for generating a driving path, and the local 3D point data is sent to the path generator 20.

As shown in FIG. 5A, the grid map generation unit 21 of the path generator 20 first generates a grid map when local 3D point data is input (S300).

To generate a grid map, it is needed to extract the center point of the trees. Since extracting the center point of a tree from a 2D space is advantageous in terms of processing speed rather than extracting the center point of the tree directly from the local 3D point data, the local 3D point data is converted into a 2D grid map by reducing the dimension of the local 3D point data in a z-axis in an exemplary embodiment of the present disclosure. To this end, a plane (i.e., ground) on which the local 3D point data is to be projected is extracted (S310). The ground candidate points of the map generated so far are grouped, and RANSAC (Random Sample Consensus)-based plane fitting is performed to extract the ground. Then, a 2D grid map is obtained by projecting each 3D point on a plane parallel to the extracted ground (e.g., a plane passing through the center of the Velodyne LIDAR sensor) (S320 and S330).

Then, smoothing is performed on the obtained 2D grid map (S340). If the leaves are thick, it can be difficult to find the exact center of the tree. Therefore, in an exemplary embodiment of the present disclosure, a smoothing process is performed using values of neighboring grids of each grid in the 2D grid map so that the center point of the tree can be more easily found.

To this end, the occupancy is calculated for each grid of the 2D grid map. In an exemplary embodiment of the present disclosure, the occupancy of each grid is calculated in a way in which the smaller the distance value between each point and the plane (i.e., the closer to the sensor center plane of the LIDAR sensor), the more weight it gives. In addition, a smoothing process is performed using the value of occupancy of the neighboring grid of each grid to obtain a smoothed 2D grid map.

For example, assume that the occupancy is calculated in the form of image pixels in Table 1 below.

TABLE 1

| 10 | 15 | 7  | 9  | 5  | 6  | 4  | 2  |
|----|----|----|----|----|----|----|----|
| 9  | 32 | 65 | 45 | 12 | 7  | 5  | 2  |
| 7  | 24 | 66 | 65 | 41 | 34 | 4  | 15 |
| 9  | 11 | 70 | 89 | 44 | 37 | 42 | 11 |
| 32 | 78 | 91 | 78 | 48 | 65 | 15 | 24 |
| 64 | 12 | 89 | 58 | 65 | 45 | 37 | 9  |
| 1  | 1  | 96 | 89 | 56 | 48 | 59 | 3  |
| 2  | 3  | 45 | 65 | 44 | 71 | 57 | 4  |

A smoothing process is performed in which the value 48 of the central portion in the distinguishably displayed area as above is replaced with a value averaged by using values of surrounding pixels. That is, the central portion value of 48 is replaced with a value of (89+44+37+78+48+65+58+65+45)/9=58.

Substitution is performed by performing the smoothing process for other pixel values in the same manner. In this way, smoothing is performed on each grid to obtain a smoothed 2D grid map. On the other hand, when smoothing is performed for all pixels, considering an increase in operation time, an integral image method can be used to quickly extract the sum of the surrounding values of each grid.

Figure 6:
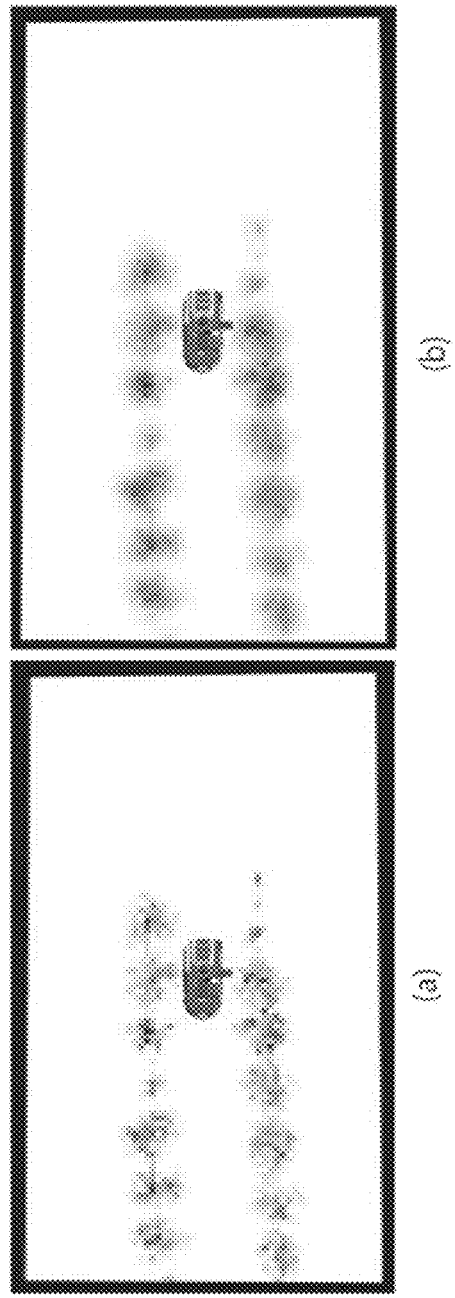
FIG. 6 is an exemplary view showing a two-dimensional (2D) grid map and a smoothed 2D grid map according to an exemplary embodiment of the present disclosure.

FIG. 6 is an exemplary view showing a 2D grid map and a smoothed 2D grid map according to an exemplary embodiment of the present disclosure.

Smoothing is performed on the 2D grid map as in (a) of FIG. 6, and then a smoothed 2D grid map as shown in (b) of FIG. 6 may be obtained. Accordingly, a more improved center point can be found based on the smoothed 2D grid map.

Next, the tree extraction unit 22 of the path generator 20 finds the center point of the tree in the smoothed 2D grid map. In the smoothed 2D grid map, there is a high probability that the center point of the tree is the point where the grid occupancy is the highest. Therefore, a tree candidate group is first generated by extracting the coordinates (x, y) of the grid having the maximum occupancy for each local area by using a non-maximal suppression (NMS) scheme (S350).

In order to prepare for errors in the extracting of the tree center point, trees that are not continuously extracted are excluded from the candidate group. Here, in the 2D grid map, a tree extract process may be performed in which a point having the maximum occupancy, that is, a pixel having a value greater than a predetermined value from that of the periphery, is determined as the center of the tree. For example, if a 2D grid map is generated 10 times per second and the tree extract process is performed 10 times per second, the tree may not be extracted depending on sensor data. For example, if it is represented as "1" when the tree extraction is and it is represented as "0" when the tree extraction is unsuccessful during the 10 tree extraction processes, it is assumed that a case 1 where the result of the 10 tree extraction processes is "1 0 0 1 1 0 0 0 0 1 (total score: 8)" and a case 2 where the result of the 10 tree extraction processes is "0 1 1 0 1 1 0 1 1 1 (total score: 29)".

Here, the total score is calculated by assigning a score of 5 in case of 1 and assigning a score of −2 in case of 0. Accordingly, the total score of case 1 is "8", and the total score of case 2 is 29. For each result, if the value of the total score value is higher than a predetermined value (e.g., 20), it is determined that the result corresponds to a tree to be continuously extracted, and if the value of the total score is equal to or less than the predetermined value (e.g., 20), it is determined that the result does not correspond to a tree to be continuously extracted. According to this process, the case 1 is determined to be a tree that is not continuously extracted, so it is excluded from the candidate group. The case 2 is determined to be a tree that is continuously extracted, so it remains in the candidate group.

In addition, tree candidates may be extracted from areas such as structured objects or the plane of a building. Therefore, this outlier is removed from the tree candidate group (S360). To this end, a 2D covariance matrix projected on the (x-y) plane is generated using k points among the raw 3D point clouds around the center of a tree candidate, and the ratio of eigenvalues are calculated from the 2D distribution matrix. When the ratio of the eigenvalues obtained for each tree candidate or the reciprocal of the ratio of the eigenvalues is greater than or equal to a predetermined value, the corresponding tree candidate is excluded from the tree candidate group.

Figure 7:
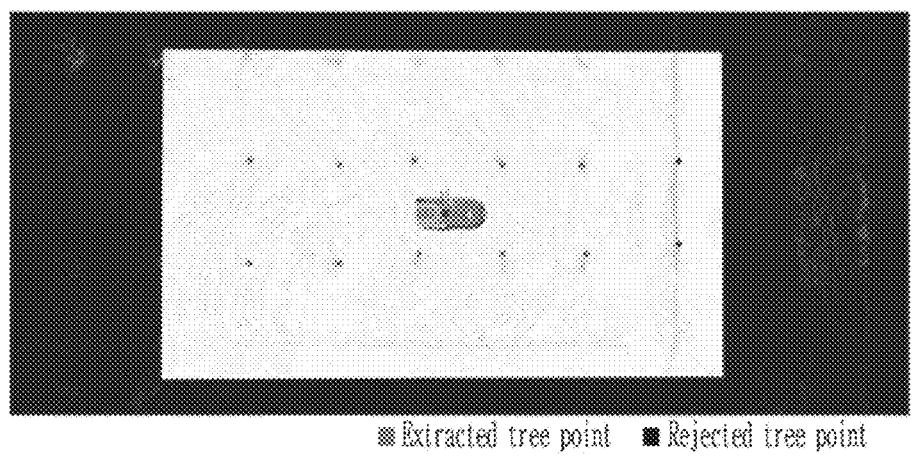
FIG. 7 is an exemplary view showing a tree extraction result according to an exemplary embodiment of the present disclosure.

Through this removal process, trees as in FIG. 7 can be extracted.

FIG. 7 is an exemplary view showing a tree extraction result according to an exemplary embodiment of the present disclosure.

For example, when the tree candidate group is generated in the smoothed 2D grid map as shown in (b) of FIG. 6 as above and outlier removal is performed on the tree candidate group, tree points as in FIG. 7, that is, tree center points, can be extracted.

Next, the line manager 23 of the path generator 20 extracts local lines around the mobile robot based on the extracted tree center points. For this, as shown in FIG. 5B, clustering is performed on the tree center points (S370). The extracted tree center points are clustered based on distance.

Local lines around the mobile robot are extracted by performing line fitting within each cluster obtained according to clustering (S380).

Figure 8:
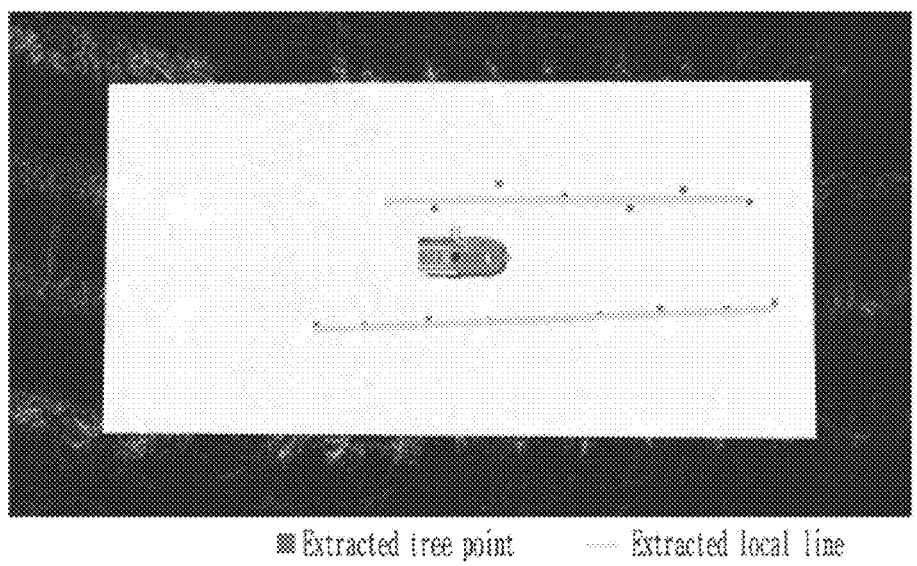
FIG. 8 is an exemplary view showing a local line extract result according to an exemplary embodiment of the present disclosure.

FIG. 8 is an exemplary view showing a local line extract result according to an exemplary embodiment of the present disclosure.

As RANSAC-based line fitting is performed within one cluster, the local line around the mobile robot is extracted as shown in FIG. 8. For a stable local line extract, only the continuously extracted local line is selected to reduce noisy lines.

Next, the similarity between the previously registered global lines and the extracted local line (e.g., the angle between the two lines, the distance, and the degree of overlapping) is measured (S390). Then, according to the measured similarity, it is determined whether to merge the corresponding local line into an existing global line or registered as a new global line (S400). For example, if the similarity is greater than or equal to a predetermined value, the corresponding local line is merged with the existing global line, and if the similarity is less than the predetermined value, the corresponding local line is registered as a new global line.

Figure 9:
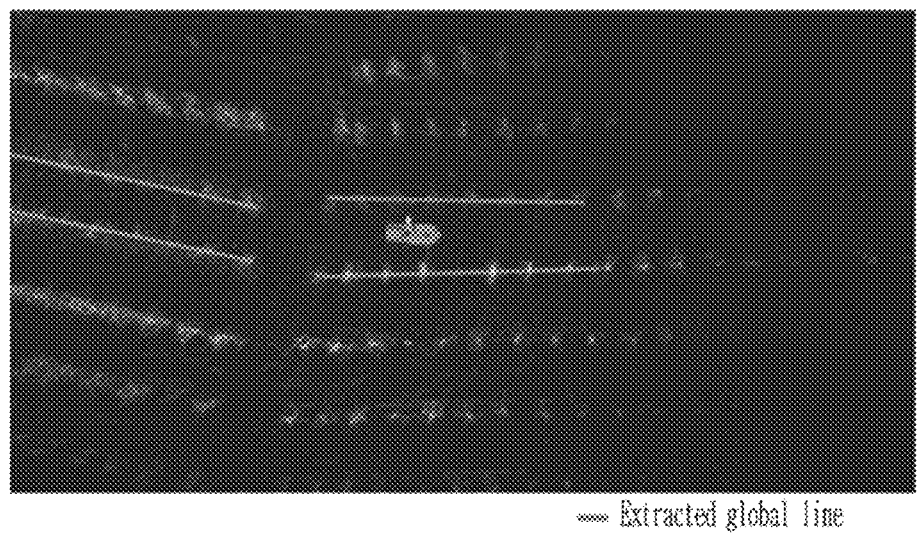
FIG. 9 is an exemplary diagram showing a global line extract and registration result according to an exemplary embodiment of the present disclosure.

FIG. 9 is an exemplary diagram showing a global line extract and registration result according to an exemplary embodiment of the present disclosure.

Even if it is registered as a global line, it can be deleted from the global lines when it does not consistently match the local line extracted in the next step. After being registered as a global line, if continuous matching with a local line is made more than a predetermined number of times (e.g. it is merged with a local line when the similarity is greater that a predetermined value), it is registered as a permanent line and it is not deleted later even if it is no longer matched. According to the global line registration processing for the extracted local lines in this way, global lines as in FIG. 9 can be obtained.

Meanwhile, with respect to global lines, two global lines determined to have high similarity by periodically comparing their similarity may be merged. After merging, the tree center points constituting the global lines are rearranged, and the end point of the line is also updated.

Next, the path processing unit 24 of the path generator 20 creates a path based on the extracted line (global lines). To this end, an effective line is identified among the extracted global lines (S410). Among the global lines, the left and right lines closest to the current position of the mobile robot are identified as effective lines, that is, the basic lines for path generation. In the global line group including the extracted global lines, the left line which is a global line that is closest to the position of the mobile robot and that is positioned on the left side of the mobile robot is identified. In addition, the right line which is a global line that is closest to the position of the mobile robot and that is positioned on the right side of the mobile robot is identified.

The center point of the end points of the left and right lines identified as the basic line is determined as the destination of the mobile robot. As the mobile robot travels, the end point of the basic line is updated, and the destination is updated accordingly. When only one of the left and right lines is identified, the point at a set distance (e.g., half of the horizontal axis interval of the tree arrangement) perpendicular to the identified line is determined as the destination considering the next rotation direction.

In this way, when the destination for driving is determined, the shortest straight driving path is generated using the currently generated grid map (e.g., a 2D grid map) information and a distance transform (DT) method (S420).

Figure 10:
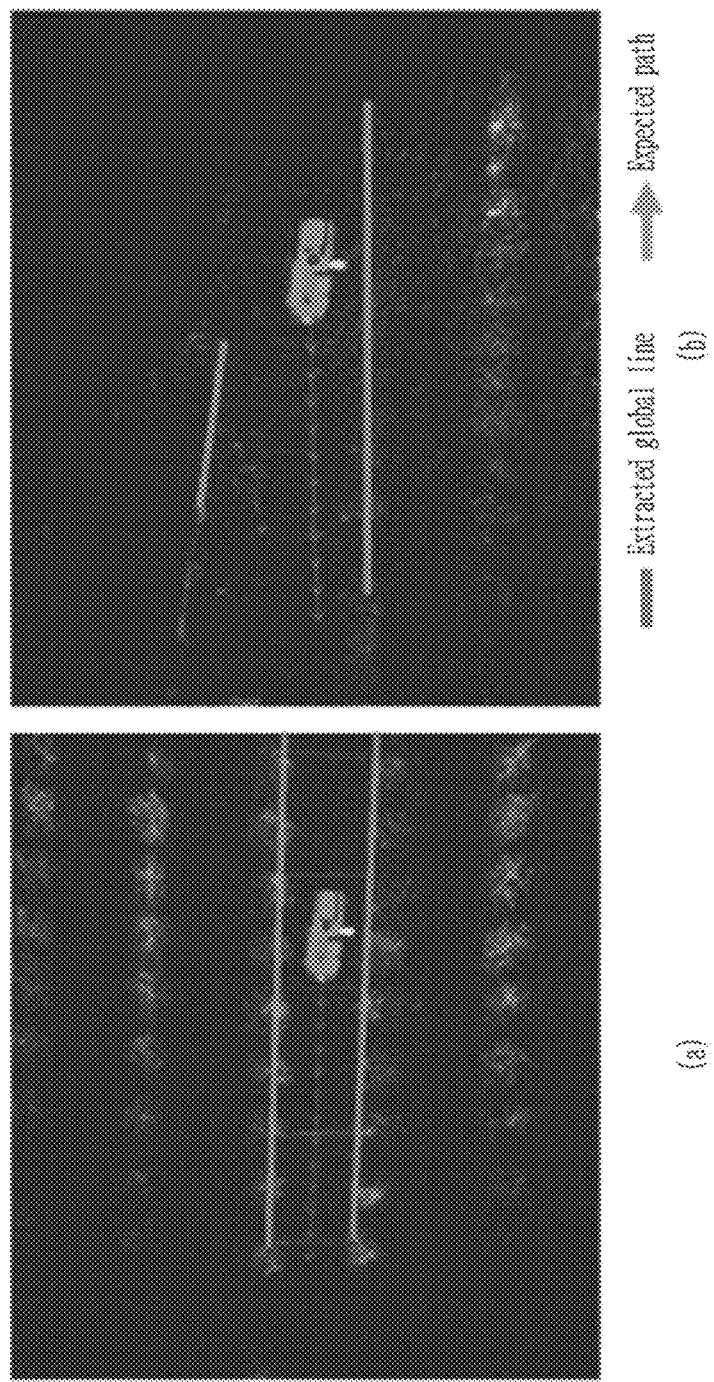
FIG. 10 is an exemplary view showing a straight forward driving path according to an exemplary embodiment of the present disclosure.

FIG. 10 is an exemplary view showing a straight driving path according to an exemplary embodiment of the present disclosure.

In the case where both the left line and the right line of the mobile robot are identified as basic lines in global lines as in FIG. 9, a straight driving path as shown in (a) of FIG. 10 may be generated. On the other hand, if only one of the left line and right line of the mobile robot is identified as a basic line, a straight driving path as shown in (b) of FIG. 10 may be generated.

On the other hand, in generating such a straight driving path, the path processing unit 24 additionally considers the position of a corresponding obstacle when it is determined that the obstacle exists between the center of the mobile robot and the destination based on the detection result provided from the obstacle detection unit 30 to generate a path that can avoid the obstacle according to the DT method.

Figure 11:
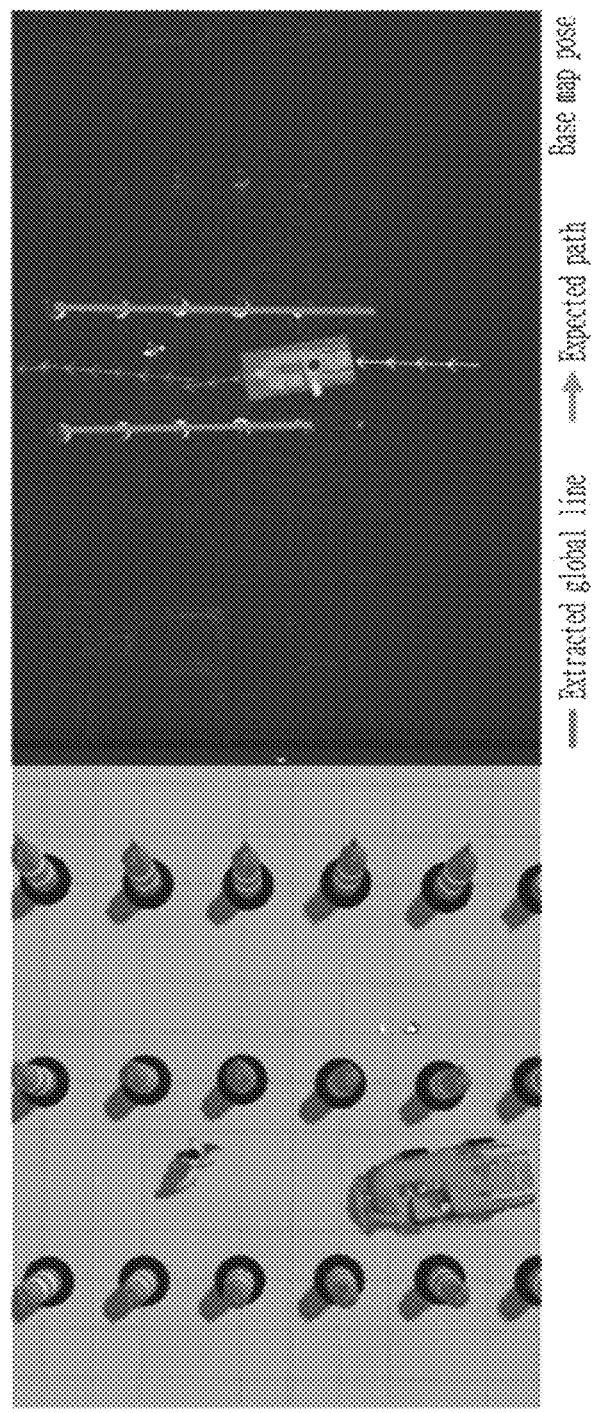
FIG. 11 is an exemplary view showing an obstacle avoidance path according to an exemplary embodiment of the present disclosure.

FIG. 11 is an exemplary view showing an obstacle avoidance path according to an exemplary embodiment of the present disclosure.

As illustrated on the left side of FIG. 11, when there is an obstacle between the destination and the mobile robot, a straight driving path capable of avoiding an obstacle, that is, an obstacle avoidance path, is generated as illustrated on the right side of FIG. 11.

On the other hand, if the distance between the end point of the basic line identified in step 3410 and the mobile robot is less than the minimum distance, and thus it is determined that the mobile robot is positioned close to the end point of the basic line, a rotation path is generated in consideration of the next rotation direction (S430).

Figure 12:
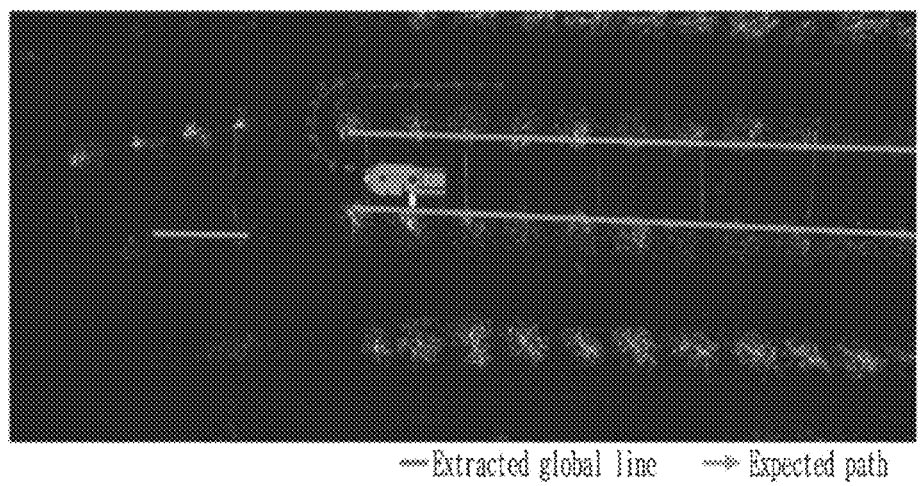
FIG. 12 is an exemplary diagram showing a rotation path according to an exemplary embodiment of the present disclosure.

FIG. 12 is an exemplary diagram showing a rotation path according to an exemplary embodiment of the present disclosure.

The rotation path as illustrated in FIG. 12 may be generated in consideration of the next rotation direction when the mobile robot is positioned close to the end point of the basic line.

The rotation path is basically generated based on a circle whose diameter is the horizontal axis of the tree arrangement. When the rotation area is narrow, a rotation path of an ellipse is generated to maintain a certain distance from surrounding objects during driving.

Figure 13:
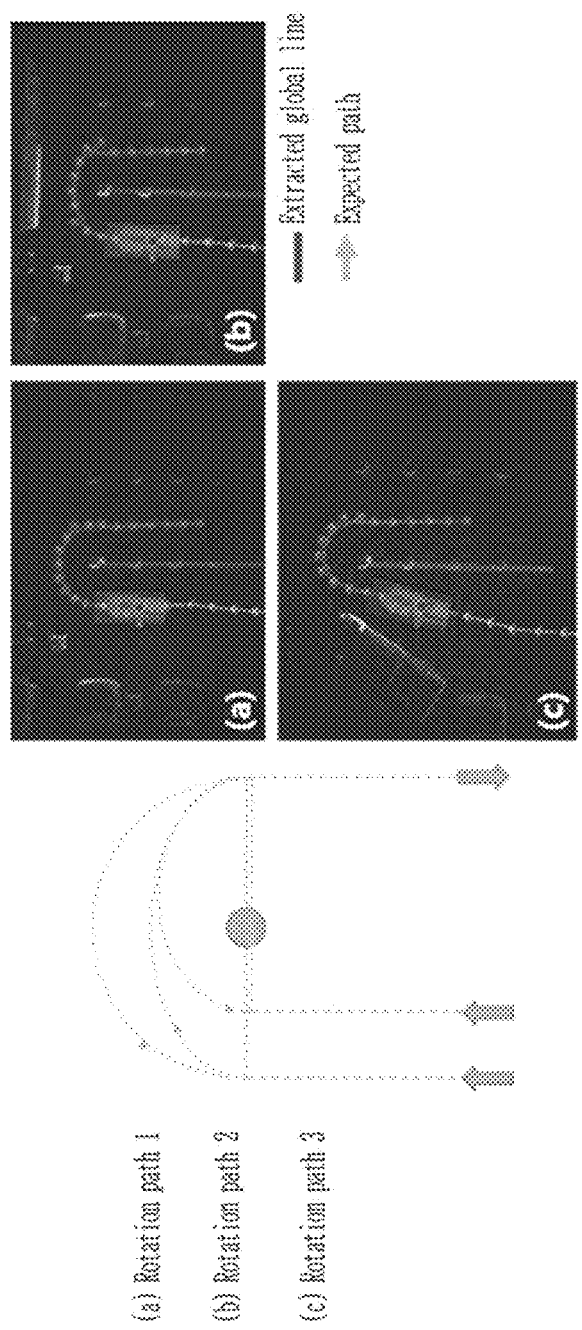
FIG. 13 is an exemplary view showing a rotation path according to a driving environment condition according to an exemplary embodiment of the present disclosure.

FIG. 13 is an exemplary view showing a rotation path according to a driving environment condition according to an exemplary embodiment of the present disclosure.

For example, in FIG. 13, a rotation path 1 is a rotation path when the surrounding space is sufficient during rotation, a rotation path 2 is a path when the surrounding space is narrow during rotation, and a rotation path 3 is an asymmetric rotation path due to a left obstacle during the straight driving.

Through the process as described above, according to an exemplary embodiment of the present disclosure, it is possible to recognize the position of the mobile robot in an orchard environment and generate a driving path (a straight driving path and a rotation path).

Meanwhile, when detecting an obstacle, the obstacle detection unit 30 detects an obstacle in order to respond to a sudden object such as a person or an animal while the mobile robot is driving.

Figure 14:
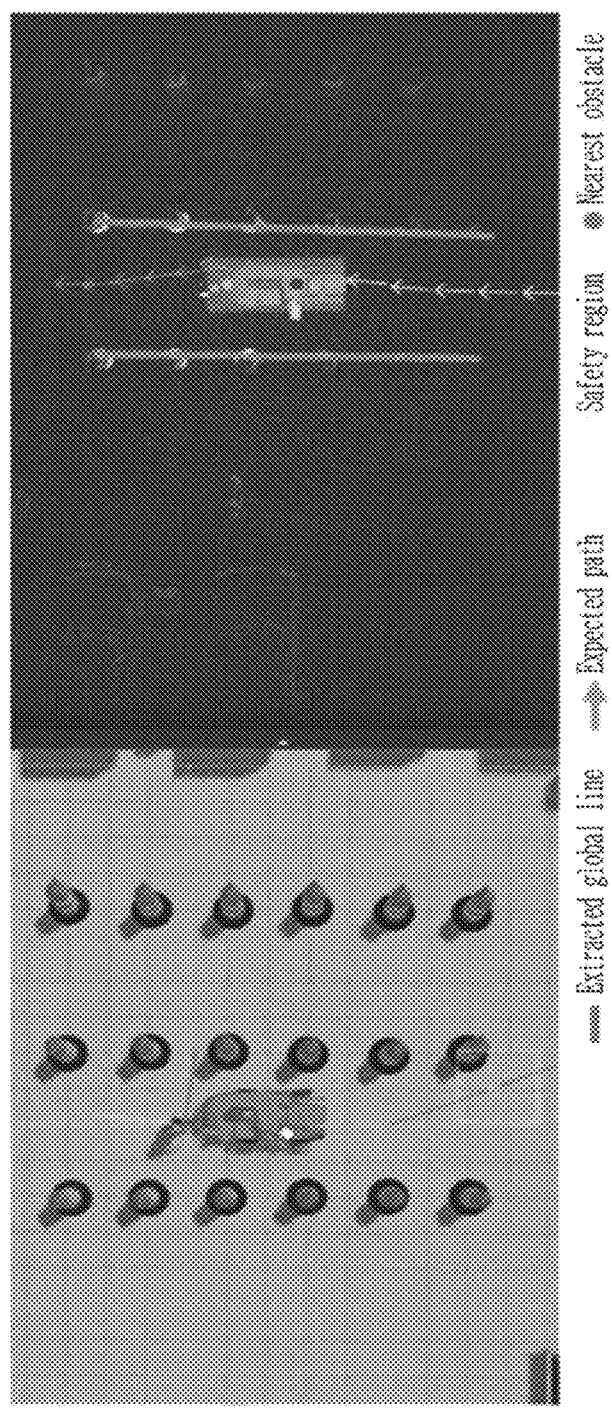
FIG. 14 is an exemplary diagram showing an obstacle detection result according to an exemplary embodiment of the present disclosure.

FIG. 14 is an exemplary diagram showing an obstacle detection result according to an exemplary embodiment of the present disclosure.

A safety region is set based on the size (width×height×length) of the mobile robot. Then, as shown in FIG. 14, among the cloud points detected in the safety area, the points closest to the center of the mobile robot are detected. In addition, the obstacle detection unit 30 sends a message related to the detected obstacle to the path generator 20.

Figure 15:
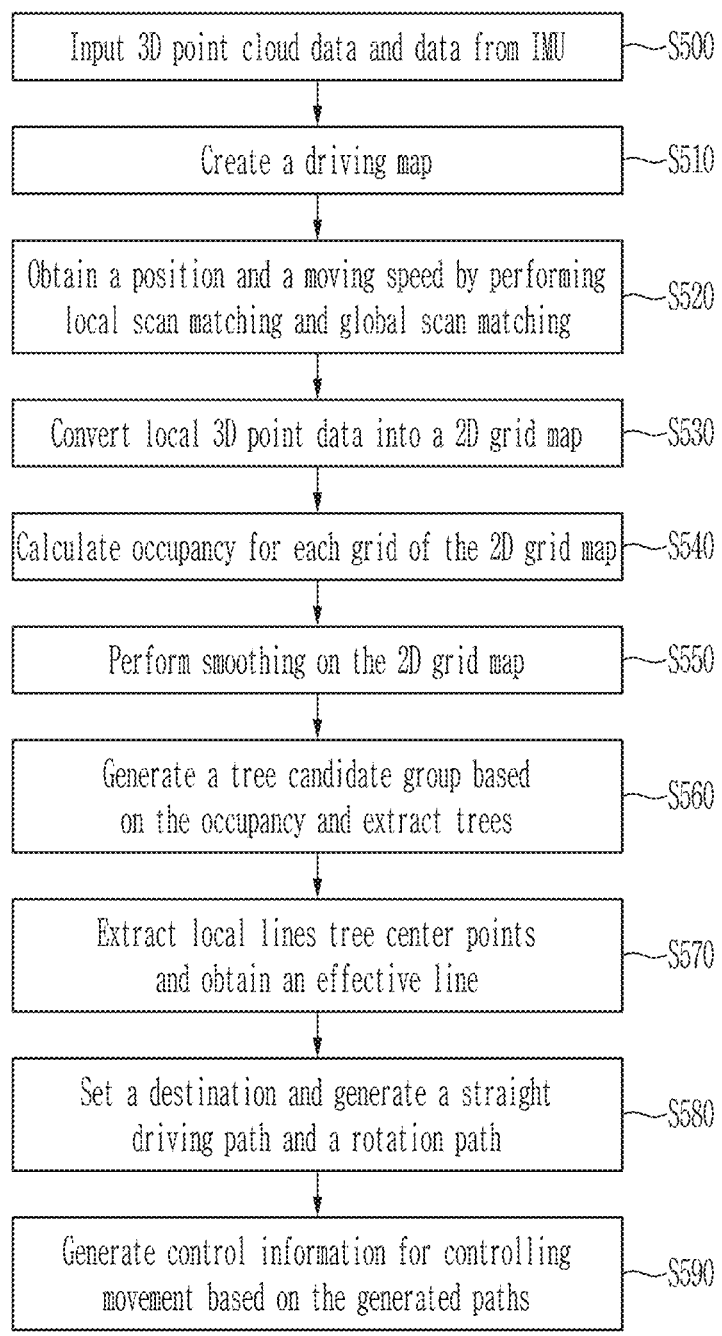
FIG. 15 is an entire flowchart of a control method for autonomous driving of a mobile robot according to an exemplary embodiment of the present disclosure.

FIG. 15 is an entire flowchart of a control method for autonomous driving of a mobile robot according to an exemplary embodiment of the present disclosure.

An exemplary embodiment of the present disclosure, the autonomous driving apparatus 1 receives 3D point cloud data and data from the IMU sensor (S500), and creates a driving map, which is a 3D map (S510).

Then, based on the 3D point cloud data and the initial position, local scan matching and global scan matching are performed to estimate the position of the mobile robot. Then, the estimated position is corrected based on the position error obtained according to the local scan matching and the global scan matching, and finally the position and the moving speed of the mobile robot are obtained (S520).

Next, the local 3D point data obtained from the 3D point cloud data is converted into a 2D grid map (S530). The occupancy is calculated for each grid of the 2D grid map, and smoothing is performed on the 2D grid map to obtain a smoothed 2D grid map (S550).

A tree candidate group is generated based on the occupancy from the smoothed 2D grid map, and the trees are extracted from the tree candidate group (S560). Then, the local line is extracted based on the center point of the extracted tree, and the basic line, which is an effective line, is obtained based on the similarity between the extracted local line and the global lines (S570).

Thereafter, a destination is generated based on the basic line, which is an effective line, and a straight driving path is generated based on the destination and the existence of obstacles between the destination and the mobile robot. Then, a rotation path is selectively generated according to the relationship between the destination and the mobile robot (S580).

As above, control information for controlling the movement of the mobile robot is generated based on the driving path (the straight path and/or the rotation path) (S590). For example, a moving speed and a rotation speed (v, ω) or a moving speed and a steering angle (v, δ) are calculated according to the driving path. Here, among the generated paths, a point separated by a certain distance (d) from the center of the mobile robot is set as a short-term target point, and a movement speed and a rotation speed (or a steering angle) are calculated using, for example, a pure-pursuit algorithm.

The mobile robot is driven according to the obtained control information.

Figure 16:
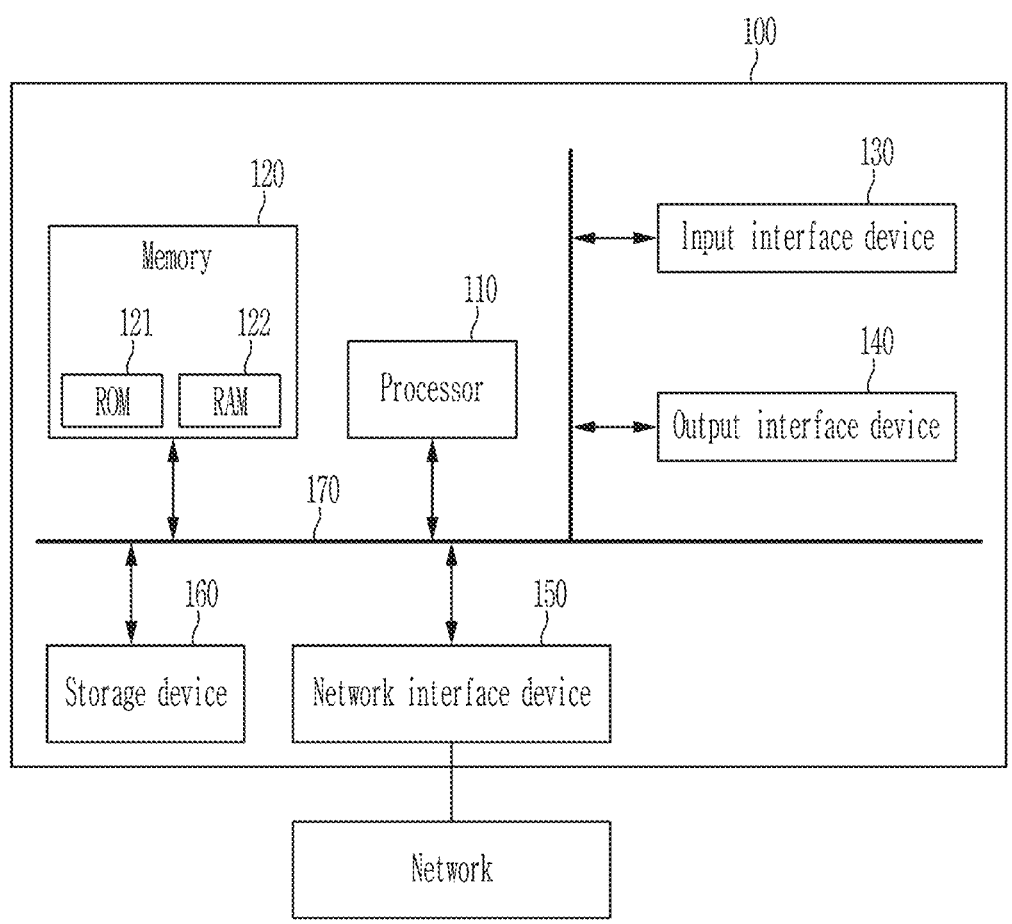
FIG. 16 is a diagram showing the structure of an apparatus for autonomous driving of a mobile robot according to another exemplary embodiment of the present disclosure.

FIG. 16 is a diagram showing a structure of an apparatus for autonomous driving of a mobile robot according to another exemplary embodiment of the present disclosure.

As shown in FIG. 16, the apparatus for autonomous driving of a mobile robot according to an exemplary embodiment of the present disclosure, that is, an autonomous driving apparatus 100, includes a processor 110, a memory 120, an input interface device 130, an output interface device 140, a network interface device 150, and a storage device 160. Each of the components may be connected by a bus 170 to communicate with each other.

The processor 110 may be configured to embody the functions and methods described based on FIGS. 1 to 15 above.

For example, the processor 110 may be configured to perform functions of a position acquisition unit, a path generator, an obstacle detection unit, and a motion controller.

The processor 110 may be implemented in various types, such as a central processing unit (CPU) or any semiconductor device that executes commands stored in the memory 120 or the storage device 160.

The memory 120 is connected to the processor 110 and shares various information related to the operation of the processor 110. The memory 120 stores instructions for an operation to be performed by the processor 110, or may temporarily store an instruction loaded from the storage device 160. The processor 110 may execute instructions that are stored or loaded into the memory 120. The memory 120 may include a ROM 121 and a RAM 122.

In an exemplary embodiment of the present disclosure, the memory 120 and the storage device 160 may be located inside or outside the processor 110, and the memory 120 and the storage device 160 may be connected to the processor 110 through various known means.

The input interface device 130 is configured to provide data to the processor 110, and the output interface device 140 is configured to output the processing data from the processor 110.

The network interface device 150 is configured to provide data received through a network to the processor 110 and to transmit the processing result of processor 110 to another device through the network.

According to an exemplary embodiment of the present disclosure, it is possible to accurately and reliably drive a mobile robot by estimating of a position of the mobile robot and generating a path in an orchard environment. Orchard work is performed by using a mobile robot, so that it is possible to shorten the working time and labor of a farm.

In addition, when a mobile robot is used as a pest controller, it is possible to prevent farmers from contacting and inhaling pesticides, and can be used in agricultural machinery such as tractors and harvesters in the future.

The embodiments of the present disclosure are not implemented only through the apparatus and/or method described above, but may be implemented through a program for realizing a function corresponding to the configuration of the embodiment of the present disclosure, and a recording medium in which the program is recorded. This implementation can also be easily performed by expert person skilled in the technical field to which the present disclosure belongs from the description of the above-described embodiments.

The components described in the embodiment s may be implemented by hardware components including, for example, at least one digital signal processor (DSP), a processor, a controller, an app cation-specific integrated circuit (ASIC), a programmable logic element such as an FPGA, other electronic devices, or combinations thereof. At least some of the functions or the processes described in the embodiment s may be implemented by software, and the software may be recorded on a recording medium. The components, functions, and processes described in the embodiment s may be implemented by a combination of hardware and software.

The method according to embodiment s may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages, and may be deployed in any form including a stand-alone program or a module, a component, a subroutine, or other units appropriate for use in a computing environment. A computer program may be deployed to be executed on one computer or on multiple computers at one site or distributed across multiple sites and interconnected by a communication network. Processors appropriate for execution of a computer program include, by way of example, both general and special purpose microprocessors, and any one or more processors of any kind of digital computer. Generally, a processor will receive instructions and data from a read-only memory or a random access memory or both, Elements of a computer may include at least one processor to execute instructions and one or more memory devices to store instructions and data. Generally, a computer will also include or be coupled to receive data from, transfer data to, or perform both on one or more mass storage devices to store data, e.g., magnetic disks, magneto-optical disks, or optical disks. Examples of information carriers appropriate for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated with, a special purpose logic circuit. The processor may run an operating system (OS) and one or more software applications that run on the OS. The processor device also may access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implementations, but it should be understood that the details do not limit any disclosure or what is claimable in the specification but rather describe features of the specific embodiment. Features described in the specification in the context of individual embodiment s may be implemented as a combination in a single embodiment. In contrast, various features described in the specification in the context of a single embodiment may be implemented in multiple embodiment s individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood that the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described embodiment s in all embodiment s, and it should be understood that the above-described program components and apparatuses may be incorporated into a single software product or may be packaged in multiple software products. It should be understood that the embodiment s disclosed herein are merely illustrative and are not intended to limit the scope of the disclosure. It will be apparent to one of ordinary skill in the art that various modifications of the embodiment s may be made without departing from the spirit and scope of the claims and their equivalents.

What is claimed is:

1. A method of recognizing a position and generating a path for autonomous driving of a mobile robot in an orchard environment, comprising:
converting three-dimensional (3D) point cloud data for the orchard environment into a two-dimensional (2D) grid map;
obtaining the position of the mobile robot by performing local scan matching and global scan matching on the 2D grid map;
extracting a tree from the 2D grid map based on occupancy of each grid of the 2D grid map;
obtaining an effective line based on center points of extracted trees; and
generating a destination based on the obtained effective line, and generating a driving path according to the generated destination and the position of the mobile robot,
wherein the extracting of a tree comprises:
generating a tree candidate group based on a grid having a maximum occupancy for each local area of the 2D grid map; and
extracting trees by removing outliers from the tree candidate group, wherein the extracting of trees by removing outliers comprises:
generating a two-dimensional (2D) covariance matrix projected on an (x-y) plane using a set number of points from among raw 3D point clouds around a center of a tree candidate included in the tree candidate group;
calculating a ratio of eigenvalues in the generated 2D covariance matrix; and
excluding a tree candidate from the tree candidate group when the ratio of the eigenvalues obtained for each tree candidate or a reciprocal of the ratio of the eigenvalues is greater than or equal to a predetermined value, and
wherein the smaller the distance between each point included in a grid and a predetermined plane, the more weight is given to calculate the occupancy for each grid.

2. The method of claim 1,
wherein the obtaining of an effective line comprises
extracting center points of the extracted trees in consideration of characteristics in which trees are arranged at a preset interval in a vertical axis and a horizontal axis in the orchard environment; and
obtaining an effective line for path generation by using the center points of the extracted trees.

3. The method of claim of claim 2,
wherein the obtaining of an effective line for path generation comprises:
performing clustering based on distances of the center points;
extracting a local line around the mobile robot by performing line fitting in each cluster obtained according to the clustering; and
obtaining an effective line by using the extracted local line.

4. The method of claim 3,
wherein the obtaining of an effective line by using the extracted local line comprises
merging the extracted local line with a pre-registered global line or registering the extracted local line as a new global line based on similarity between the pre-registered global line and the extracted local line to obtain a global line group and then obtain an effective line from the global line group.

5. The method of claim 4, wherein the obtaining of an effective line by using the extracted local line comprises obtaining a left line and a right line as an effective line among global lines included in the global line group, wherein the left line is a global line that is closest to the position of the mobile robot and that is located on the left side of the mobile robot, and the right line is a global line that is closest to the position of the mobile robot and that is located on the right side of the mobile robot.

6. The method of claim 1, wherein the generating of the destination comprises:

when the effective line includes a left line located on the left side of the mobile robot and a right line located on the right side of the mobile robot, determining a center point between an end point of the left line and an end point of the right line as the destination of the mobile robot; and when the effective line includes only the left line or the right line, determining a point at a predetermined distance perpendicular to the included line in consideration of a rotation direction of the mobile robot as the destination of the mobile robot, wherein the predetermined distance corresponds to half of a horizontal axial spacing of trees arranged in the orchard environment.

7. The method of claim 1, wherein the generating of the destination comprises:

generating a straight driving path of the mobile robot according to the destination;

generating an obstacle avoidance path for avoiding an obstacle by additionally considering a position of the obstacle when the obstacle exists between the destination and the center of the mobile robot; and generating a rotation path in consideration of the rotation direction of the mobile robot when a distance between the end point of the effective line and the mobile robot is less than a minimum distance.

8. The method of claim 1, wherein the obtaining the position of the mobile robot comprises:

performing local scan matching based on 3D point cloud data input at time t−1 and 3D point cloud data input at time t;

performing global scan matching using the 3D point cloud data input at the point t and a global point cloud map; and obtaining the position of the mobile robot based on the local scan matching result and the global scan matching result.

9. The method of claim 8, wherein the obtaining of the position of the mobile robot based on the local scan matching result and the global scan matching result comprises correcting an estimated position of the mobile robot based on a position error according to the local scan matching result and a position error according to the global scan matching result to finally obtain the position of the mobile robot.

10. The method of claim 1, wherein the converting of 3D point cloud data comprises:

extracting a plane to be projected for local 3D point data obtained from the 3D point cloud data; and projecting each 3D point of the local 3D point data onto the plane to obtain the 2D grid map, wherein the plane is the ground.

11. The method of claim 1, further comprising, after the converting of 3D point cloud data, performing smoothing by using a value of a grid at a periphery of each grid of the 2D grid map, and the obtaining of a position of the mobile robot and the extracting of a tree are performed based on the smoothed 2D grid map.

12. An apparatus of recognizing a position and generating a path for autonomous driving of a mobile robot in an orchard environment, comprising an interface device configured to receive input of three-dimensional (3D) point cloud data for the orchard environment; and a processor configured to recognize the position of the mobile robot and generate a path based on the 3D point cloud data, wherein the processor is configured to perform the following operations:

converting the 3D point cloud data for the orchard environment into a two-dimensional (2D) grid map;

obtaining the position of the mobile robot by performing local scan matching and global scan matching on the 2D grid map;

extracting a tree from the 2D grid map based on occupancy of each grid of the 2D grid map;

obtaining an effective line based on center points of extracted trees; and generating a destination based on the obtained effective line, and generating a driving path according to the generated destination and the position of the mobile robot, wherein, when performing the extracting of a tree, the processor is configured to perform the following operations:

generating a tree candidate group based on a grid having a maximum occupancy for each local area of the 2D grid map;

generating a two-dimensional (2D) covariance matrix projected on an (x-y) plane using a set number of points from among raw 3D point clouds around a center of a tree candidate included in the tree candidate group;

calculating a ratio of eigenvalues in the generated 2D covariance matrix; and excluding a tree candidate from the tree candidate group when the ratio of the eigenvalues obtained for each tree candidate or a reciprocal of the ratio of the eigenvalues is greater than or equal to a predetermined value, wherein the smaller the distance between each point included in a grid and a predetermined plane, the more weight is given to calculate the occupancy for each grid.

13. The apparatus of claim 12, wherein, when performing the obtaining of an effective line, the processor is configured to perform the following operations:

extracting center points of the extracted trees in consideration of characteristics in which trees are arranged at a preset interval in a vertical axis and a horizontal axis in the orchard environment;

performing clustering based on distances of the center points;

extracting a local line around the mobile robot by performing line fitting in each cluster obtained according to the clustering; and obtaining an effective line by using the extracted local line.

14. The apparatus of claim 13, wherein the processor is configured to merge the extracted local line with a pre-registered global line or register the extracted local line as a new global line based on similarity between the pre-registered global line and the extracted local line to obtain a global line group and then obtain an effective line from a global line group, and obtain a left line and a right line as an effective line among global lines included in the global line group, wherein the left line is a global line that is closest to the position of the mobile robot and that is located on the left side of the mobile robot, and the right line is a global line that is closest to the position of the mobile robot and that is located on the right side of the mobile robot.

15. The apparatus of claim 12, wherein, when performing the generating of the destination, the processor is configured to perform the following operations:

when the effective line includes a left line located on the left side of the mobile robot and a right line located on the right side of the mobile robot, determining a center point between an end point of the left line and an end point of the right line as the destination of the mobile robot; and when the effective line includes only the left line or the right line, determining a point at a predetermined distance perpendicular to the included line in consideration of a rotation direction of the mobile robot as the destination of the mobile robot, wherein the predetermined distance corresponds to half of a horizontal axial spacing of trees arranged in the orchard environment.

16. The apparatus of claim 12, wherein, when performing the generating of the destination, the processor is configured to perform the following operations:

generating a straight driving path of the mobile robot according to the destination;

generating an obstacle avoidance path for avoiding an obstacle by additionally considering a position of the obstacle when the obstacle exists between the destination and the center of the mobile robot; and generating a rotation path in consideration of the rotation direction of the mobile robot when a distance between the end point of the effective line and the mobile robot is less than a minimum distance.

17. The apparatus of claim 12, wherein, when performing the obtaining the position of the mobile robot, the processor is configured to perform the following operations:

performing local scan matching based on 3D point cloud data input at time t−1 and 3D point cloud data input at time t;

performing global scan matching using the 3D point cloud data input at the point t and a global point cloud map; and correcting an estimated position of the mobile robot based on a position error according to the local scan matching result and a position error according to the global scan matching result to finally obtain the position of the mobile robot.

* * * * *